(12) United States Patent
Winner

(10) Patent No.: US 12,139,247 B2
(45) Date of Patent: Nov. 12, 2024

(54) WING RIG

(71) Applicant: Boards & More GmbH

(72) Inventor: Ken Winner, Oberhaching (DE)

(73) Assignee: Boards & More GmbH, Molin (AT)

( * ) Notice: Subject to any disclaimer, the term of this patent is extended or adjusted under 35 U.S.C. 154(b) by 294 days.

(21) Appl. No.: 17/771,779

(22) PCT Filed: Oct. 29, 2020

(86) PCT No.: PCT/EP2020/080436
§ 371 (c)(1),
(2) Date: Apr. 25, 2022

(87) PCT Pub. No.: WO2021/084024
PCT Pub. Date: May 6, 2021

(65) Prior Publication Data
US 2022/0396341 A1    Dec. 15, 2022

(30) Foreign Application Priority Data

Oct. 31, 2019  (DE) .......................... 102019129501.7
Aug. 25, 2020  (DE) .......................... 102020122145.2

(51) Int. Cl.
*B63H 8/12*    (2020.01)
(52) U.S. Cl.
CPC ..................... *B63H 8/12* (2020.02)
(58) Field of Classification Search
CPC ................... B63H 8/10; B63H 8/12
See application file for complete search history.

(56) References Cited

U.S. PATENT DOCUMENTS

| 4,563,969 | A | 1/1986 | Le Bail | |
|---|---|---|---|---|
| 5,448,961 | A | 9/1995 | Ansteensen | |
| 11,447,210 | B2 | 9/2022 | Walpurgis | |
| 11,554,842 | B1* | 1/2023 | Girardin | B63B 32/40 |
| 2022/0297810 | A1* | 9/2022 | Myerscough | B63H 8/12 |
| 2022/0371710 | A1* | 11/2022 | Winner | B63H 8/10 |
| 2022/0396341 | A1* | 12/2022 | Winner | B63H 8/10 |
| 2023/0035554 | A1* | 2/2023 | Wright | B63H 8/16 |
| 2023/0294807 | A1* | 9/2023 | Pajank | B63H 8/16 |
| | | | | 114/39.16 |
| 2024/0124112 | A1* | 4/2024 | Salles | B63H 8/12 |

FOREIGN PATENT DOCUMENTS

| DE | 102018104431 | 8/2019 |
|---|---|---|
| DE | 10 2019 101 656 | 7/2020 |
| WO | WO 95/05973 | 3/1995 |
| WO | WO 2016/059179 | 4/2016 |

OTHER PUBLICATIONS

European Office Action dated May 10, 2023 from European Application No. 20 800 829.2-1009.
British Office Action dated Jan. 6, 2023 from British Application No. GB2207645.9.
(Continued)

*Primary Examiner* — Erez Gurari
(74) *Attorney, Agent, or Firm* — Beyer Law Group LLP

(57) ABSTRACT

Disclosed is a hand held wing rig a center strut of which has recessed grips.

12 Claims, 4 Drawing Sheets

(56) References Cited

OTHER PUBLICATIONS

Hocquinghem, Stephane "Wing Surf Swing the new wing of F-One / Foil Magazine, toute l'information du foil ou hydrofoil", Jun. 24, 2019, https://foil-magazine.com/wing-surf-decouvrez-une-nouvelle-dimension-du-sup-avec-la-swing-de-f-one/, retrieved from the internet Apr. 25, 2022.
U.S. Appl. No. 17/772,949, filed Apr. 28, 2022.
U.S. Appl. No. 17/772,049, filed Apr. 26, 2022.
International Search Report dated Feb. 18, 2021 from International Application No. PCT/EP2020/080436.
Written Opinion dated Feb. 18, 2021 from International Application No. PCT/EP2020/080436.
Hocquinghem, Stephane "Wing Surf Swing la nouvelle aile de F-One / Foil Magazine, toute l'information du foil ou hydrofoil", Jun. 24, 2019, https://foil-magazine.com/wing-surf-decouvrez-une-nouvelle-dimension-du-sup-avec-la-swing-de-f-one/, retrieved from the internet Apr. 25, 2022.
Hansen, "Kite Tube Size. Is Bigger Better?", Apr. 30, 2014, https://switchkitesriders.blogspot.com/search?q=is+bigger+better, retrieved from the internet Apr. 25, 2022.
Naish Stand Up Paddling: 2020 Naish Wing-Surfer. May 19, 2019, Video 0:00 m:s bis 2:41 m:s in particular video sequence 0:04 m:s. https://www.youtube.com/watch?v=QQgJupaQubU (screenshots attached).
Windsurf.de: F-One Swing 2020. Oct. 10, 2019, Video 0:00 m:s bis 1:02 m:s in particular video sequence 0:07 m:s. https://www.youtube.com/watch?v=Y9h1W-BzY7U (screenshots attached).
German Office Action dated Jul. 9, 2024 from German Application No. 10 2020 122 145.2 (with English translation).

* cited by examiner

WING RIG

The invention relates to a hand held wing rig for types of sports, which are driven by wind power, for example, foil surfing, in accordance with the preamble of the patent claim 1.

Wing rigs are described, for example, under the name of "Slingwing", "Foil Wing", "Wing Surfer" on the Internet. This is a wing, which is realized in the manner of a kite with a front tube forming a leading edge, and a single strut, which are preferably inflatable. Retaining loops are formed on the central strut and on the front tube respectively, with the aid of which the user holds the inflatable wing rig during use, for example, when he or she is foiling or ice skating or skiing.

In the U.S. Pat. No. 4,563,969, a rigid wing rig is shown, in which the leading edge and a boom are formed by a complex tubular structure, which is spanning a canopy. The leading edge is curved in an arched manner when seen in a plan view. The boom is supported by a plurality of struts on the leading edge. These struts are designed in such a way that they give the leading edge a concave structure in a front view, that means, when viewed in the direction of flow of the wing rig, in which structure the end sections (tips) of the wing rig are flared upward from a central apex of the leading edge.

A disadvantage of this solution is the fact that due to the complex structure of the boom and the leading edge, the total weight of the wing rig is very high, so that the use in water sports is only possible with appropriate buoyancy bodies. Another disadvantage is the fact that the assembly and disassembly of the wing rig takes a long time due to the complex tube structure. The hard tube structure of the leading edge and of the boom is also involving a considerable risk of injury for the user in the event of a skidding fall.

A similar rigid wing rig is shown in WO 95/05973 A1. In this solution as well the leading edge and the boom are formed by a complex tubular structure. The structure shows the same disadvantages as the wing rig in accordance with the U.S. Pat. No. 4,563,969, which has been discussed above.

In the document U.S. Pat. No. 5,448,961 a flat wing rig with a closed frame structure is described—such a solution is also unusable for water sports due to the high weight, the time consuming assembly/disassembly, and the risk of injury.

This is the reason why the solutions, which have been mentioned at the beginning of this description, in which the wing rig is realized with an inflatable strut to which retaining loops are attached for holding purposes, have become established. These concepts are characterized by a low weight and a comparatively high buoyancy.

As it has been explained, these wing rigs are guided by hand, wherein the setting of the wing rig in relation to the wind must always be changed depending on the wind strength and the wind direction as well as the planned maneuver. Depending on the angle of attack with respect to the water surface and with reference to the vertical axis of the user, the grip position, in particular of the rear hand on the side of the trailing edge, can change in this case. But the retaining loops, which are usually provided, make it difficult to change the holding position in this way.

Hocquingham Stéphane disclosed in "Wing Surf Swing la nouvelle aile de F-One I Foil Magazine, toute l'information du foil ou hydrofoil", on Jun. 24, 2019 (2019-06-24), XP055646755, a hand held wing rig for types of sports, which are driven by wind power. The rig has an inflatable fronttube and an inflatable centerstrut, whereby the fronttube and the centerstrut span a canopy. At least one handle is secured at the centerstrut, whereby the centerstrut is arced or bulged in a middle part.

In contrast, the invention is based on the task of creating a wing rig with improved handling characteristics.

This task is solved by a wing rig with the features of the patent claim 1.

Advantageous further embodiments of the invention are the subject of the dependent patent claims.

The hand held wing rig according to the invention is intended for types of sports, which are driven by wind power, such as, for example, foil surfing, and it has an inflatable front tube from which extends an inflatable center strut on which at least one handle is arranged. The front tube and the center strut are forming a support structure for a canopy. According to the invention, the center strut is reduced in diameter or stepped back and/or bulged and/or set/extended in sections in order to form at least one recessed grip. The term "recessed grip" is understood to mean in this case a configuration of the center strut through which a reach through area for the hand of the user is formed, so that the handle does not have to be bulged downward (toward the user).

In the solution according to the invention, the holding area is thus integrated into the center strut, so to speak, wherein the relative position of the recessed grip can be adjusted with regard to optimum ergonomics when holding the wing rig.

In one embodiment of the invention, the gripping is facilitated, if a holding web is extending over the recessed grip, which holding web is forming the handle, and can be gripped by the user, wherein the grip area is formed by the recessed grip and the holding web. The holding web can be straight, curved, angled, U shaped, V shaped or realized in any other ergonomically optimized way.

Holding the wing rig is particularly easy, if several recessed grips, preferably one or two recessed grip (s), are distributed along the longitudinal axis of the center strut.

In this case, a recessed grip on the side of the leading edge can have a smaller longitudinal extension than a recessed grip on the side of the leading edge.

In one embodiment of the invention, a holding web/a handle is assigned to each recessed grip.

In the case of an alternative solution, the holding web is extending over both recessed grips, wherein the holding web may preferably be supported in the region between the recessed grips.

According to the invention, it is advantageous if, in contrast to the known solutions, which have been described at the beginning, the holding web is made of a material, which is resistant to bending and torsion resistant by comparison, so that the wing rig can also be pivoted laterally, for example, about the axis of the center strut, and the torque, which is required for the pivoting, is transmitted to the support structure via the holding web. This is difficult to implement in the case of the conventional solutions, because the retaining loops, which are used, are flexible and are also not attached to the center strut in a manner, which is resistant to bending, and for this reason do not permit any torque to be transmitted.

In a preferred embodiment, the holding web is realized with a grip optimized shell which is surrounding a core which is resistant to bending/torsion resistant.

The recessed grip can be accessed particularly well, if the same is realized with an approximately trapezoidal cross section.

The wing rig is realized to be particularly aerodynamic and torsionally stiff, if the center strut is tapering downstream of a recessed grip which is located on the side of the trailing edge.

The holding web can be integrated into the center strut. Alternatively, however, it is also possible to attach the holding web to the center strut in a replaceable manner.

In order to form the recessed grip, that means, the reach through area above the handle/the holding web, it can be provided that the center strut is arched upward. In this context, the center strut, for example, can be arched upward toward the canopy in an area, which is adjacent to the front tube, so that the recessed grip/the reach through area is limited toward the top by this arching.

This can be formed, for example, by two strut legs, which are set in relation to one another and integrated into the center strut, wherein the strut leg on the side of the front tube is preferably shorter than the strut leg which is located on the side of the trailing edge.

The stability of the center strut can be optimized in the case of this solution, if it is formed in the area adjacent to the arching, over which the holding web or the handle is extending, with a larger diameter than in the area of the arching.

The applicant reserves the right to direct a separate independent patent claim to the arching of the center strut.

Preferred embodiments of a wing rig according to the invention are explained in more detail in the following with reference to the schematic drawings, which are showing the following:

Figure 4:
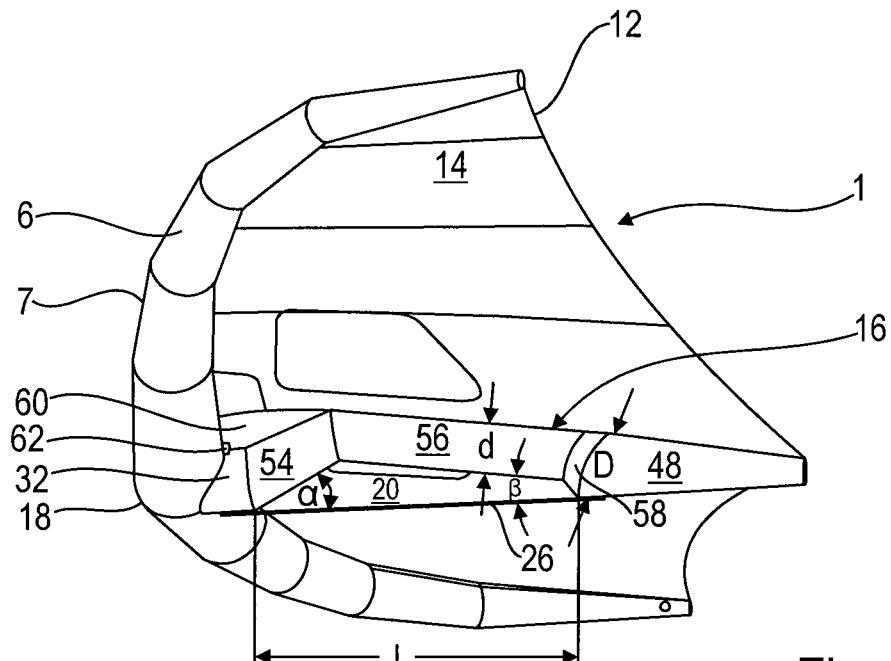
Figure 5:
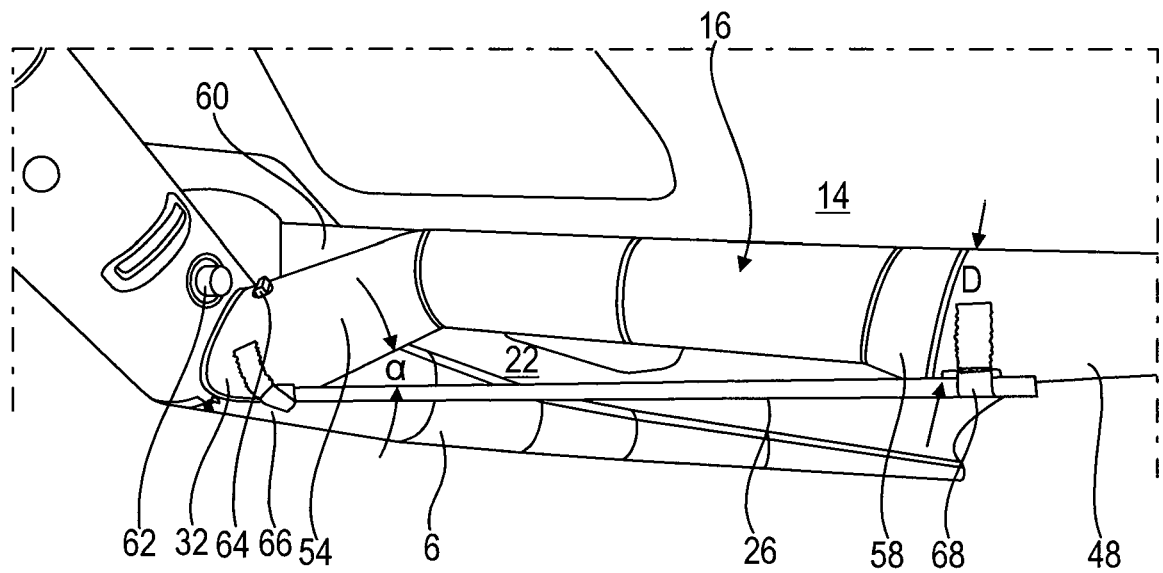
Figure 6:
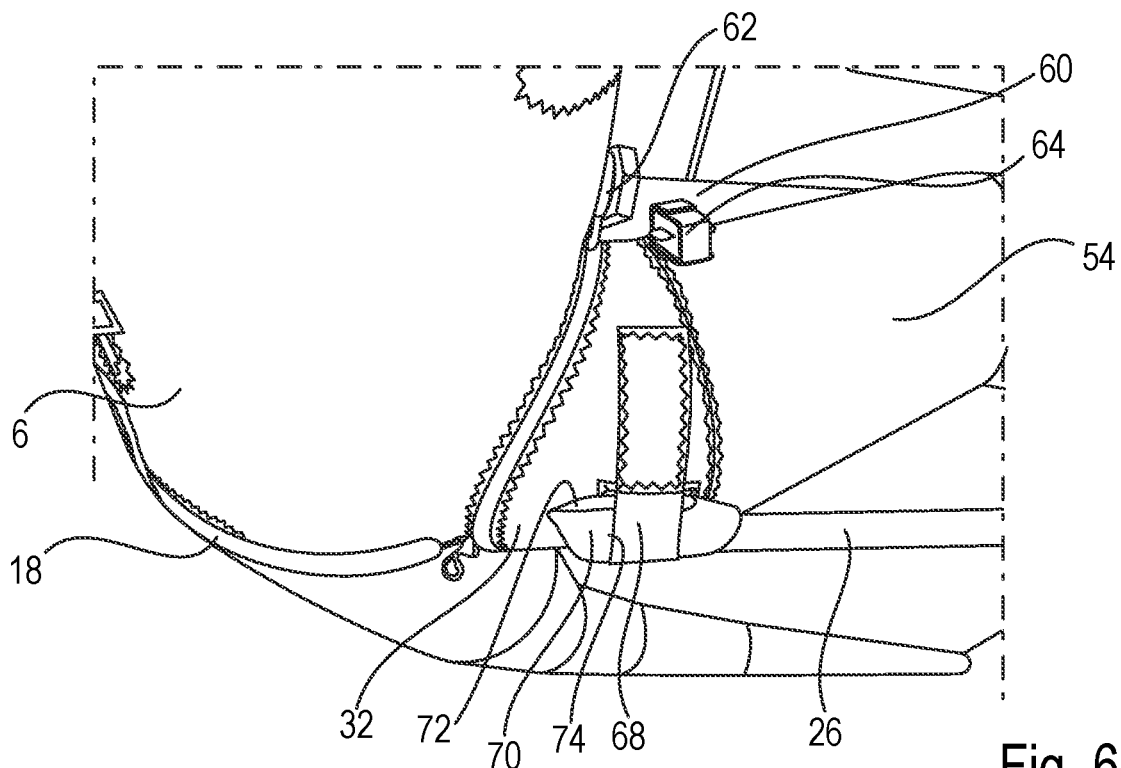
Figure 7:
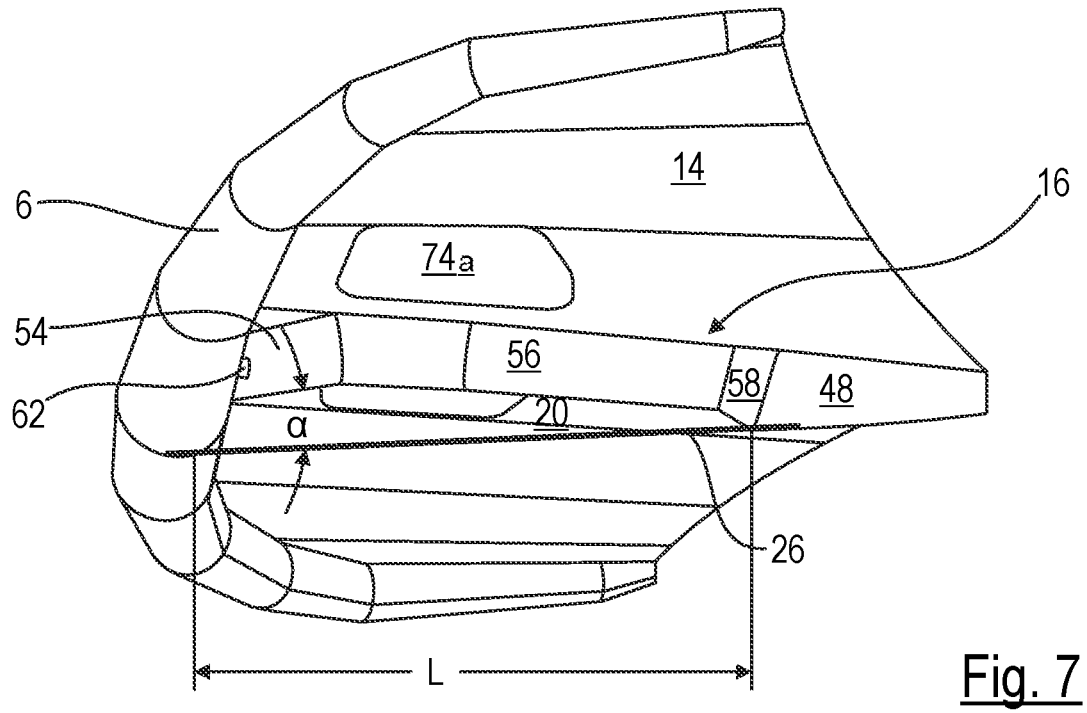

FIG. 4 a further embodiment of a wing rig according to the invention in a three dimensional schematic diagram;

FIG. 5 is a partial view of a concrete realization of the embodiment in accordance with the FIG. 4;

FIG. 6 is a detail of the representation in accordance with the FIG. 5, and FIG. 7 is a further embodiment of a wing rig according to the invention.

Figure 1:
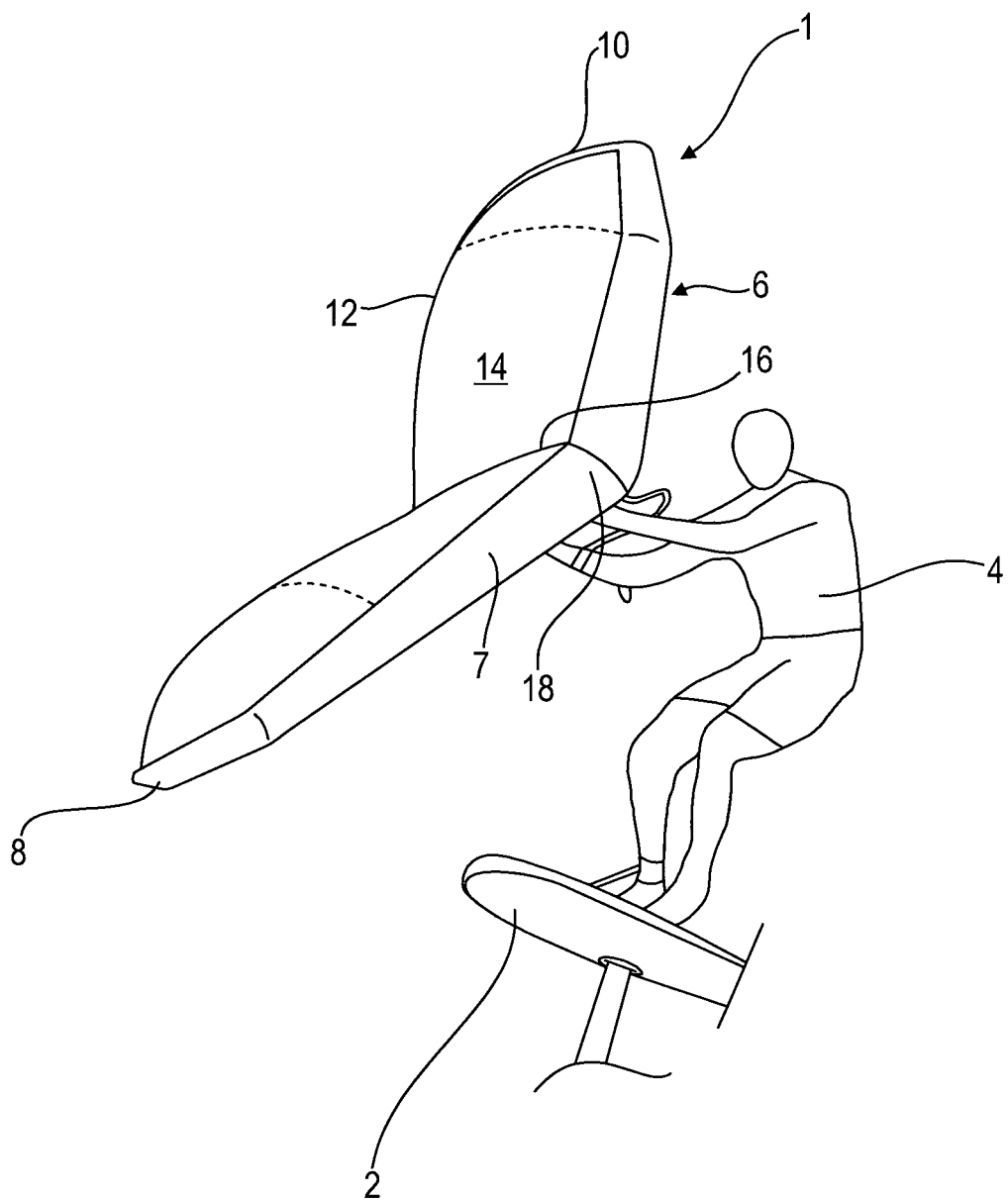
FIG. 1 is a schematic diagram of the use of a wing rig, which is used in order to propel a foil board.

FIG. 1 is showing the use of a wing rig 1 according to the invention in order to propel a foil board 2. A surfer 4 is holding the wing rig 1 in this case with his or her hands only, and adjusts it with reference to the wind depending on the desired direction of travel (upwind, half-wind, downwind) or depending on the buoyancy to be set, for example, when jumping or adjusting the ride height (immersion depth of the foil), and depending on the wind strength and the swell.

The wing rig 1 has an inflatable front tube 6, which is forming a leading edge 7, which is formed approximately in an arched manner in a plan view, and is extending with tips 8, 10 to a trailing edge 12 of a canopy 14 of the wing rig 1. This is spanned on the one hand by the front tube 6 and on the other hand by an inflatable center strut 16 which together are forming a support structure of the wing rig 1. In the process, the surfer is holding the wing rig 1 only at the center strut 16, which bulges downward in the view in accordance with the FIG. 1 and in accordance with the FIG. 2. As explained in an earlier application, DE 10 2019 101 656.8, the description of which is hereby expressly referred to, the front tube 6 is set in an approximately V or U shaped manner not only in the top view but also in a front view—as seen in the direction of flow—wherein the V/U is widening upward, that means away from the surfer, in the front view. As it can be seen in the FIG. 1, the trailing edge 12 as well, and thus the entire canopy surface 14 is set in a V shaped manner in the front view or in a rear view.

Figure 2:
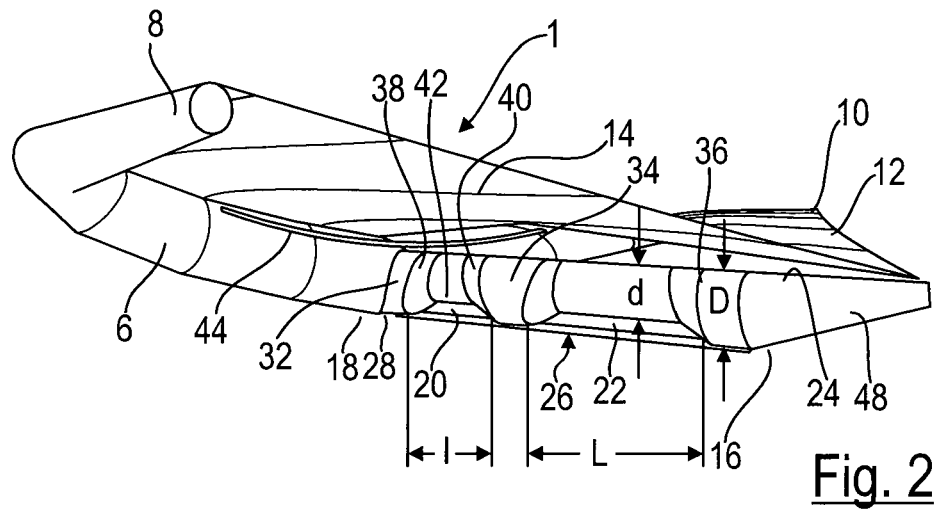
FIG. 2 is a three dimensional side view of a wing rig in accordance with the FIG. 1.

FIG. 2 shows a three dimensional side view of the wing rig 1. It can be seen that in a plan view in accordance with the FIG. 3, which is described in the following, the wing rig 1 is formed approximately in a U shaped manner, and is tapering away from an apex 18 and toward the two tips 8, 10. In the region of the apex 18, the center strut 16 is tied down, wherein reinforcements, which are not shown here, are provided in the connection region, in order to optimize the application of force between the center strut 16 and the leading edge (front tube) 6.

In the embodiment, which is shown in the FIG. 2, the center strut 16 varies in diameter in order that two recessed grips 20, 22 are formed, in the area of which the diameter d of the center strut 16 is smaller than the diameter D of the adjacent strut sections. As can be seen from the FIG. 2, however, these recessed grips 20, 22 are preferably not formed along the entire circumference, but only in the region of the center strut 16, which is facing away from the canopy 14. A circumferential surface region 24 on the side of the canopy is formed in a continuous manner without a step. By the term "diameter" the extension of the center strut 16 in the view in accordance with the FIG. 2 is to be meant. In this case, it is not a round cross section, which is postulated, but a cross section, which is deviating therefrom, for example, an oval or rounded cross section, for example, a trapezoidal cross section, can be used as well.

The recessed grip 20 on the side of the leading edge in FIG. 2 has a smaller length I than the recessed grip 22 on the side of the trailing edge, which is realized with a length L that is at least 1.5 times, preferably more than 2 times the length I of the front recessed grip 20. As a result of the greater length L, the surfer 4 is enabled to adjust the rear hand position on the side of the trailing edge very quickly in accordance with the setting of the wing rig 1, so that the execution of the maneuvers, which have been described at the beginning of the present description, is facilitated.

For holding purposes, a holding web 26 is extending over the two recessed grips 20, 22 in the illustrated example of the embodiment, which holding web is attached to the circumferential region 28 located at the bottom in FIG. 2, away from the canopy 14. In the illustrated example of the embodiment, a holding web 26 extends over both recessed grips 20, 22. In principle, it is also possible to assign an own holding web to each one of the recessed grips 20, 22.

In the example of the embodiment shown, the holding web 26 is fixed to strut sections 32, 34, 36, which are laterally adjacent to the recessed grips 20, 22. This attachment can be made in a detachable manner, for example, by means of pockets or the like, which are realized in the manner of a batten pocket, and are permitting a connection of the holding web 26 which is resistant to bending. This is particularly advantageous because a torque for transverse adjustment of the wing rig 1 can then also be applied via the holding web 26, which is connected to the center strut 16 in a torsion resistant manner and in a manner resistant to bending, as it has been mentioned at the beginning of this description, this is not possible in the case of the conventional retaining loops.

The holding web 26 can be made out of a comparatively stiff molded part. In principle, it is also possible to surround a core comparatively resistant to bending and torsion resistant with a comparatively soft shell, which is optimized for grip, in order to improve grip comfort. In a concept in which the holding web 26 or the holding webs 26 are replaceably retained on the center strut 16, this bending stiffness and the ability to transmit torque can be adjusted by replacing the holding webs 26. In this way, for example, it may be advantageous for beginners to make the holding webs 26 somewhat softer, in order that unintended movements of the hand are not directly transmitted to the wing rig 1. Experienced surfers will then prefer stiff holding webs 26 due to the direct transmission of force. By the holding web 26 the stiffness of the center strut 16 is increased as well.

In the example of the embodiment, which is shown in FIG. 2, the recessed grips 20, 22 are approximately of a trapezoidal shape in the side view which is visible there. Accordingly, the recessed grips 20, 22 are each limited laterally by two inclined surfaces 38, 40 (provided with reference numeral only in the case of the recessed grip 20), via which the actual diameter reduction takes place and which then pass into a web 42 which is formed with the diameter d as it is shown in the FIG. 2. The cross section in the area of this web 42 is then correspondingly ovalized, wherein the width (perpendicular to the drawing plane) in the area of the circumferential surface region 24 is greater than in the sections, which are facing the holding webs 26. In this way, the tapering of the center strut 16 in the area of the recessed grip 20. 22 is asymmetrical.

As it is moreover shown in the FIG. 2, the end section 48 of the center strut 16, which is adjoining the recessed grip 22, is tapered toward the trailing edge 12.

Figure 3:
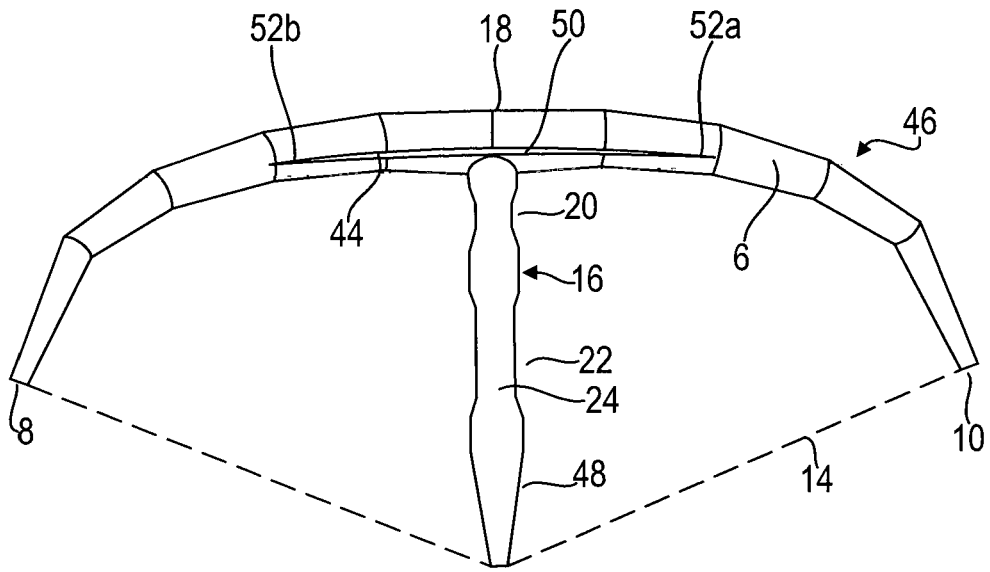
FIG. 3 is a schematic top view of a support structure of the wing rig in accordance with the FIGS. 1 and 2.

In the FIGS. 2 and 3, a further special feature of an embodiment of a wing rig 1 according to the invention is illustrated. Accordingly, the front tube 6 is realized with a stiffening element 44, in order to improve the bending stiffness/the torsional stiffness, the function of which is explained with reference to FIG. 3.

This is showing a top view of a support structure 46, which is formed by the leading edge (front tube 6) and the center strut 16 connected thereto, and which spans the canopy 14 of the wing rig 1, which is indicated by dashed lines. In the embodiment, which is shown in the FIG. 3, the lateral areas of the two recessed grips 20, 22 are shown. The stiffening element 44, which is described below, however, can be used with wing rig 1 as well, for which a boom made out of a tubular profile in accordance with the DE 10 2019 101 656 A1, or a continuous center strut 16 without recessed grips 20, 22 is used.

In the illustration in accordance with the FIG. 3, the approximately U shaped curvature of the front tube 6 is shown in plan view, wherein the center strut 16 is attached to the apex 18 of the front tube 6. The stiffening element 44 extends centrally in sections approximately along the longitudinal axis of the front tube 6. The stiffening element 44 can in this case be a stiffening bar, which is designed in the manner of a sail batten. This can be made, for example, out of a sandwich material, out of carbon fiber, out of an aluminum profile or the like.

In one embodiment, it is intended to integrate this stiffening element 44 into the outer skin of the front tube 6. Alternatively, however, pockets or holders can also be formed on the latter, via which the stiffening element 44 is attached to the front tube 6 in a replaceable manner. In this case, for example, the stiffening element 44 can be provided with different stiffnesses, in order to enable an adaptation to different wind and wave conditions.

In the embodiment shown, the stiffening element 44 is extending approximately transversely to the center strut 16. The attachment is made here in such a way that when the support structure 46 is inflated, for example, via a valve, which is arranged on the front tube 6, and a one pump system, the stiffening element 44 is braced with the support structure 46, so that an undesirable twisting of the support structure 46 under high loads can be prevented or at least reduced. The stiffening element 44 can also be formed in accordance with the desired V/U adjustment of the front tube 6. In this way, a stable wing profile is provided that ensures optimum inflow even under different operating conditions.

The stiffening element 44, for its part, can be profiled so that, for example, a central region 50 is realized with a greater bending stiffness/torsional stiffness than the end regions 52a, 52b. In principle, it is also possible that the stiffening element 44 itself is formed, for example, in a T shaped manner, so that it extends in sections along the center strut 16 as well and is stiffening the same, at least in the connection region.

In one embodiment, the support structure 46 is formed with a plurality of such stiffening elements 44, wherein, for example, separate stiffening elements can be provided for the profiling of the front tube 6 in the area of the tips 8, 10. The stiffening elements 44 can—as it is shown in the FIGS. 2 and 3—be formed in the connection region of the center strut 16 above (view in accordance with the FIGS. 2, 3) or below the same as well.

The stiffening elements 44 can be curved or profiled in accordance with the desired U shape of the front tube 6, as it has been explained above. The use of such stiffening elements 44 in the support structure 46 according to the invention makes it possible to design the latter with a somewhat smaller cross section so that, despite the smaller diameter, the predetermined profile of the wing rig 1 is maintained at minimal weight even in gusty conditions or in heavy swell and during complex maneuvers as well. The narrow profile significantly reduces the resistance to flow of the wing rig 1 in the process compared with conventional solutions, so that the riding characteristics at minimized weight are superior to conventional solutions.

In accordance with the invention, it is preferred that the stiffening elements 44 be retained on the support structure 46 in a replaceable manner, in order that the wing rig 1 can be compactly folded up after the air has been released and the stiffening elements 44 have been removed. This replaceability also opens up the possibility of making the profile of the support structure 46 stiffer or softer by omitting or varying the stiffening elements 44.

In the embodiment, which has been described above, the axis of the center strut 16 extends substantially in a straight line away from the front tube 6 and toward the trailing edge 12. In FIG. 4 an embodiment is shown, in which the center strut 16 is formed with a bulged/angled region by which the recessed grip 20, that means, the reach through is formed above the holding web 26. The geometry of the front tube 6 is substantially the same as the embodiment, which has been previously described. The center strut 16 is also connected via a strut section on side of the front tube which is referred to below as the connection section 32. This is attached to the front tube 6 in the region of the apex 18 and has a relatively small longitudinal extension compared with the overall length of the center strut 16. Following this connection section 32, the center strut 16 is realized with a strut leg 54, which is set at a predetermined angle $\alpha$ to the actual center strut axis, which is running in parallel to the longitudinal axis of the holding web 26. Said angle of attack $\alpha$ is selected in such a way that the recessed grip 20, which results due to the setting, reaches a sufficient clear height (with respective to the distance of the holding web 26 from the canopy 14) which is formed for safe gripping. In this context, the length of the strut leg 54 is substantially shorter than the length L of the recessed grip 20 and/or of the operating range of the holding web 26. Adjacent to the strut leg 54, a further strut leg 56 is formed which extends from the connection region to the strut leg 54 back again to the holding web 26. In this context, an angle of attack β of the strut leg 56 with respect to the holding web 26 is smaller than the angle of attack α of the strut leg 54. Accordingly, the length of the strut leg 56 is also greater than that of the strut leg 54. The two strut legs 54, 56 have approximately a diameter d. In the region of transition to the tapering end section 48 of the center strut 16, the diameter is conically enlarged to the dimension D. As it can be seen from the illustration in accordance with the FIG. 4, the holding web 26 is attached in this region on the one hand to the end section 48 and on the other hand to the connection section 32 and/or the front tube 6. As it has been explained, the center strut 16 is tapering from the connection section to the strut leg 56 toward the trailing edge 12, so that the flowing off of the air stream is not obstructed.

In this way, the strut legs 54, 56, the conical region of transition 58 and the end of the end section 48, which is facing the latter, delimit the recessed grip 20 upward in the manner of an oblique trapezoid, the base of which is formed by the holding web 26. The length L of this recessed grip 20 is sufficient in this case in order to grip the wing rig 1 with the highest precision and guidance during all required maneuvers, wherein the grip position is freely variable and does not depend on the positioning of loops or the like, as this is the case with the state of the art. Another advantage of the concept according to the invention is the fact that the aerodynamics are not worsened by additional handles, which are projecting downward, since in the case of the wing rig 1 according to the invention the holding web 26 is virtually integrated into the center strut 16.

In the illustrated embodiment, the canopy 14 is attached to the center strut 16 along the strut leg 56, the conical region of transition 58, and the end section 48. The distance between the canopy 14 and the strut leg 54 and the connection section 32 in the illustrated embodiment is filled by a cloth 60 or a connecting web, so that the canopy profile is stabilized as well.

In the FIG. 4 a valve 62 is shown by means of which the front tube 6 can be inflated. In this context, the wing rig 1 can be realized with a one pump system by means of which the center strut 16 can be inflated as well.

FIG. 5 shows a partial representation of a specific embodiment, in which, in addition to the valve 62 of the front tube 6, a further filling valve 64 is provided, which is designed in the manner of a check valve, and which makes it possible to fill the center strut 16 independently of the front tube 6, so that, for example, the center strut 16 is filled with a higher filling pressure than the front tube 6 in order to increase the stability. The valve 62 of the front tube 6 is realized in a manner similar to a kite. The design of such valves is explained in the application WO 2016/059 179 A1.

In the illustration in accordance with the FIG. 5, one can see quite clearly the shorter strut leg 54, which is extending in the extension of the connection section 32, and set at an angle α to the holding web 26, wherein the strut leg is extending away from the front tube 6 and upwards toward the canopy 14. This is then joined by the longer strut leg 56, which is extending from the apex of the recessed grip 22 back again toward the holding web 26. The butted end section 48 of the center strut 16 is attached to the longer strut leg 56 via the conical region of transition 58. As it has been explained above, the holding web 26 is then attached to the area of the end section 48 with the diameter D and to the connection section 32 and/or front tube 6.

In the embodiment shown, the holding web 26 is realized as a round profile in the area in which it is gripped during the use of the wing rig 1, wherein a non slip covering can be provided on the holding web 26 in order to increase a secure grip. The holding web 26 is fixed to the center strut 16 with the aid of suitable fastening means, in this specific case by fastening lugs 66, 68, into which the holding web 26 can be fitted in a replaceable manner. Of course, any other type of fixation or a non detachable fixation of the holding web 26 can be realized as well. The positional fixing can be effected, for example, by means of a Velcro fastener or the like as well.

As it can be seen from the detailed illustration in accordance with the FIG. 6, which is showing the fastening lug 66 on the side of the front tube, the holding web 26 can be realized in this area with a fixing profile 70 into which the tube profile of the holding web 26 is immersed. Toward the connection section 32 of the center strut 16, the fixing profile 70 is realized with a bearing surface 72, which is resting flatly against the connection section 32 without any intermittent stress. Furthermore, a fixing groove 74 is formed on the outer circumference of the fixing profile 70, into which a belt strap of the fastening lug 68 is immersed, so that a lateral slipping (in longitudinal axis of the holding web 26) is reliably prevented.

In principle, this fixing profile 70 can also be performed at the connection section 32, so that the holding web 26 is then inserted into the fixing profile 70. In the embodiment, which is shown in the FIG. 6, the end section of the holding web 26 on the right side is performed as a tubular profile, which is inserted into the fastening lug 68, so that the positional fixing in the longitudinal direction is substantially effected via the fixing profile 70. Of course, a corresponding fixing profile can also be provided at the end section of the holding bar 26 on the right side in the FIG. 5.

As it has already been explained above, the center strut 16 can be realized with a round profile in each of the sections described. In principle, however, it is also possible to widen said profile toward the canopy 14 or toward the user, so that an asymmetrical profile of the center strut 16 and/or the front tube 6 is realized. The canopy 14 can be sewn directly with the center strut 16. In principle, however, it is also possible to connect the canopy 14 to the center strut 16 via connecting webs, such as, for example, the cloth 60 or any other support structure, in order to optimize the inflow profile.

In FIG. 7 a variant of the embodiment in accordance with the FIGS. 4 to 6 is shown. Compared with the previously described embodiments, the first strut leg 54 is attached in this embodiment to the front tube 6 in an upward direction, offset toward the canopy 14, directly or via a connection section, which is not visible in FIG. 7. As in the previously described embodiment, the strut leg 54 is set at an angle of attack α to the axis of the holding web 26. The second strut leg 56, the conical region of transition 58 as well as the end section 48 of the center strut 16 then adjoin said strut leg 54, so that in turn a recessed grip and/or a reach through area 20 is formed in the manner of an oblique trapezoid. In principle, the strut leg 54 can be attached directly to the front tube 6, so that the structure of the center strut 16 is somewhat simpler than in the previously described embodiment.

As in the previously described embodiment, the holding web 26 is fixed on the one hand to the underside of the front tube 6 (view in accordance with the FIG. 7) and/or approximately diametrically to the connection of the strut leg 54 and on the other hand to the end section 48 of the center strut 16.

The advantage of the embodiment in accordance with the FIG. 7 substantially consists in the fact that the clear width of the recessed grip 20 and thus the effective length L of the holding web 26 is greater than in the embodiments, which have been previously described. Otherwise, the embodiment in accordance with the FIG. 7 corresponds to the embodiment in accordance with the FIGS. 4, 5 and 6, so that further explanations are unnecessary.

In the representations in accordance with the FIGS. 4 to 7, the canopy 14 is in each case still realized with windows 74a, which are implemented by means of a transparent material, and which enable the user to detect watercraft or other obstacles which are on a collision course.

Disclosed is a hand held wing rig a center strut of which has recessed grips.

REFERENCE NUMERALS 1 wing rig
2 foil board
4 surfer
6 front tube
7 leading edge
8 tip
10 tip
12 trailing edge
14 canopy
16 center strut
18 apex
20 recessed grip
22 recessed grip
24 circumferential surface region
26 holding web
28 circumferential region
32 strut section/connection section
34 strut section
36 strut section
38 lateral surface
40 lateral surface
42 web
44 stiffening element/stiffening bar
46 support structure
48 end section
50 central region
52 end region
54 strut leg
56 strut leg
58 conical region of transition
60 cloth
62 valve
64 filling valve
66 fastening lug
68 fastening lug
70 fixing profile
72 bearing surface
74 fixing groove
74a window

The invention claimed is:

1. A hand held wing rig for types of sports, which are driven by wind power, comprising an inflatable front tube, from which an inflatable center strut extends, wherein the front tube and the center strut are spanning a canopy, and at least one handle is fixed to the center strut, wherein the center strut is reduced in diameter or stepped back and/or bulged and/or set/extended in sections in order to form at least one recessed grip, and wherein a holding handle extends over the recessed grip.

2. The wing rig according to patent claim 1, wherein the handle is formed from a holding web that extends over the recessed grip.

3. A hand held wing rig for types of sports, which are driven by wind power, comprising an inflatable front tube, from which an inflatable center strut extends, wherein the front tube and the center strut are spanning a canopy, and at least one handle is fixed to the center strut, wherein the center strut is reduced in diameter or stepped back and/or bulged and/or set/extended in sections in order to form at least one recessed grip, and wherein several recessed grips are provided along the longitudinal axis of the center strut.

4. The wing rig according to patent claim 3, wherein a recessed grip on the side of the front tube has a smaller longitudinal extension than a recessed grip on the side of the trailing edge.

5. The wing rig according to patent claim 3, wherein a holding web extends over several recessed grips or one holding web is assigned to each recessed grip.

6. The wing rig according to claim 2, wherein the holding web is made out of a material, which is resistant to bending.

7. The wing rig according to claim 2, wherein the center strut is tapering downstream of a recessed grip toward the trailing edge.

8. The wing rig according to claim 2, wherein the holding web is retained on the center strut or on the front tube substantially secured against rotation and/or in a torsion resistant manner.

9. The wing rig according to claim 2, wherein the at least one holding web is retained on the center strut in a replaceable manner.

10. The wing rig according to claim 2, wherein the center strut is arched upward toward the canopy in an area, which is adjacent to the front tube.

11. The wing rig according to patent claim 10, wherein the arching is formed by two strut legs set in relation to one another, wherein the strut leg on the side of the front tube is shorter than the strut leg, which is located on the on the side of the trailing edge.

12. The wing rig according to patent claim 10, wherein the center strut has an enlarged diameter downstream of the arching.

* * * * *